US 011368511 B2

United States Patent
Auyeung et al.

(10) Patent No.: US 11,368,511 B2
(45) Date of Patent: Jun. 21, 2022

(54) UNIFICATION OF RICE PARAMETER LOOKUP TABLE

(71) Applicant: TENCENT AMERICA LLC, Palo Alto, CA (US)

(72) Inventors: Cheung Auyeung, Sunnyvale, CA (US); Xiang Li, Saratoga, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 16/895,475

(22) Filed: Jun. 8, 2020

(65) Prior Publication Data

US 2020/0404040 A1 Dec. 24, 2020

Related U.S. Application Data

(60) Provisional application No. 62/863,972, filed on Jun. 20, 2019.

(51) Int. Cl.
  *H04N 19/176* (2014.01)
  *H04L 65/65* (2022.01)
  *H04L 65/60* (2022.01)
  *H04L 65/61* (2022.01)
  *G06F 16/901* (2019.01)

(52) U.S. Cl.
  CPC ........ *H04L 65/608* (2013.01); *G06F 16/9017* (2019.01); *H04L 65/4069* (2013.01); *H04L 65/607* (2013.01); *H04N 19/176* (2014.11)

(58) Field of Classification Search
  None
  See application file for complete search history.

(56) References Cited

U.S. PATENT DOCUMENTS

| | | | | |
|---|---|---|---|---|
| 9,936,200 | B2 * | 4/2018 | Sole Rojals | ......... H04N 19/156 |
| 2014/0307800 | A1 * | 10/2014 | Sole Rojals | ........... H04N 19/60 |
| | | | | 375/240.18 |
| 2015/0016537 | A1 * | 1/2015 | Karczewicz | ........... H04N 19/91 |
| | | | | 375/240.18 |
| 2016/0100189 | A1 * | 4/2016 | Pang | .................... H04N 19/593 |
| | | | | 375/240.13 |

FOREIGN PATENT DOCUMENTS

WO   WO-2016196376 A1 * 12/2016  ........... H04N 19/126

OTHER PUBLICATIONS

Benjamin Brooks, et al., "Versatile Video Coding (Draft 5)", Joint Video Experts Team (JVET) of ITU-T SG 16 WP 3 and ISO/IEC JTC 1/SC 29/WG 11, Document: JVET-N1001-v7, 14th Meeting: Geneva, Switzerland, Mar. 19-27, 2019.

\* cited by examiner

*Primary Examiner* — Chikaodili E Anyikire
(74) *Attorney, Agent, or Firm* — Sughrue Mion, PLLC

(57) ABSTRACT

According to an embodiment, a method of selecting a Rice parameter for encoding a video bitstream using at least one processor includes obtaining an absolute level corresponding to a current transform block; determining whether transform skip is enabled; generating a lookup variable based on the absolute level and the determination of whether the transform skip is enabled; obtaining the Rice parameter from a lookup table based on the lookup variable; and encoding a residual subblock based on the Rice parameter.

20 Claims, 8 Drawing Sheets

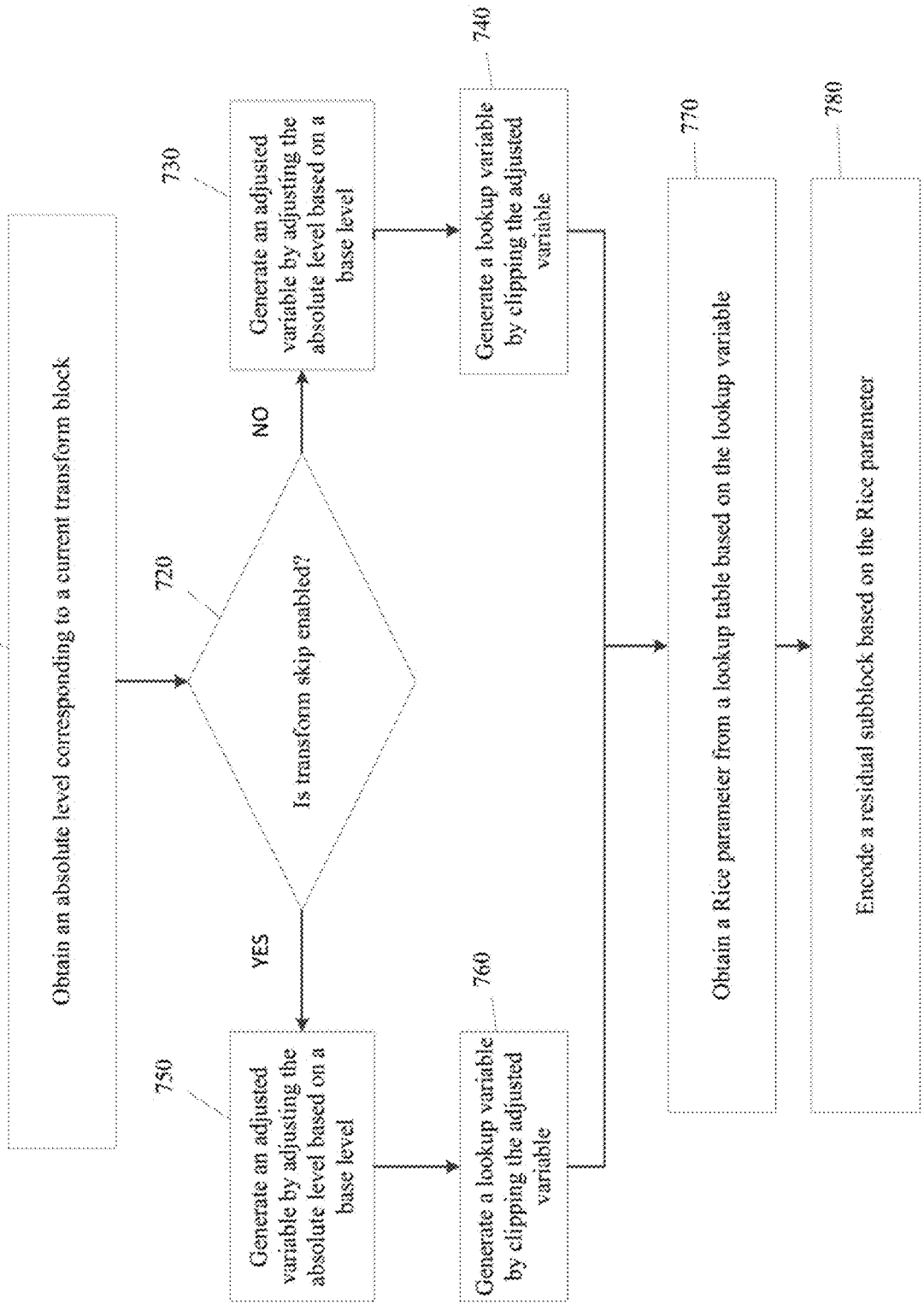

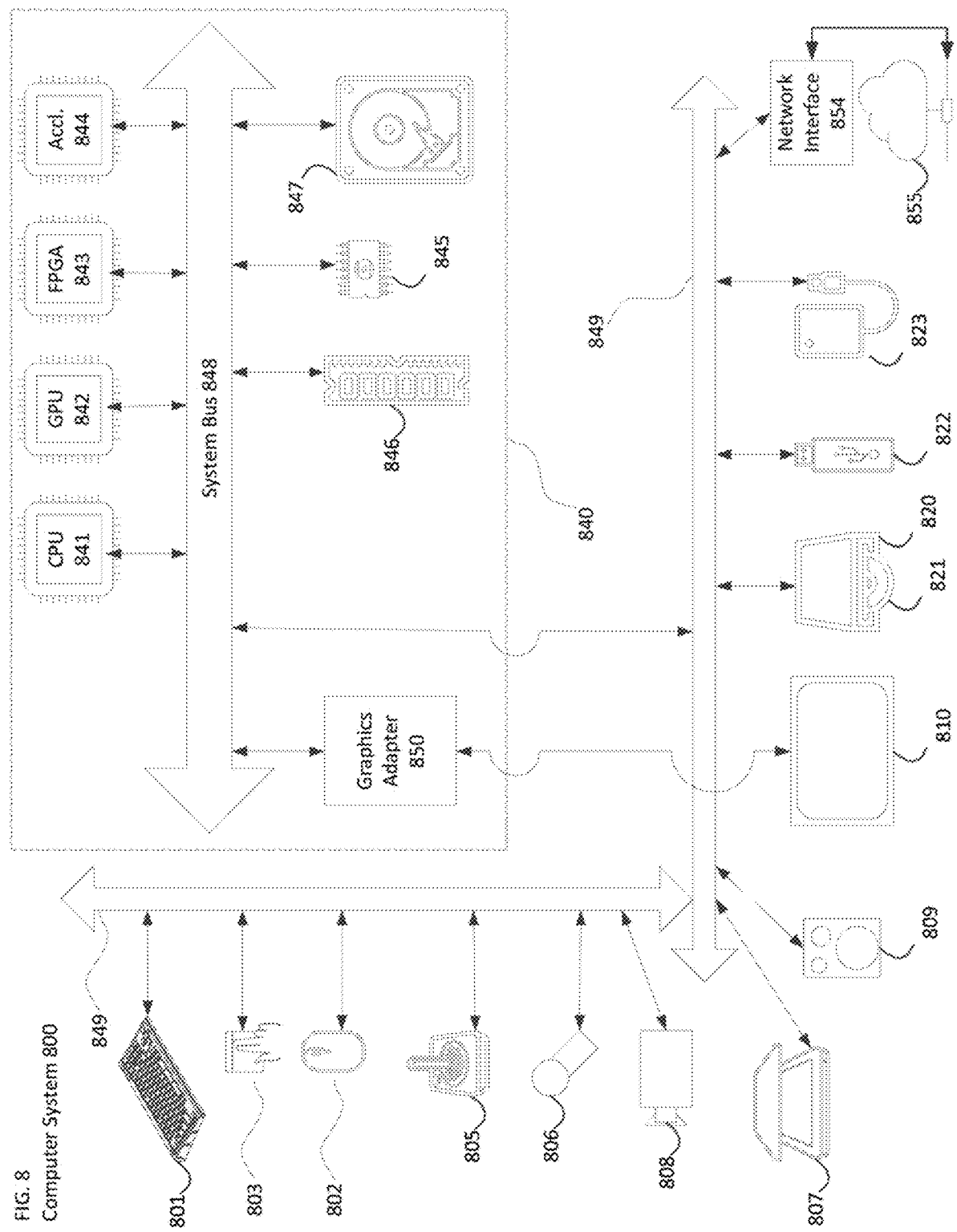

UNIFICATION OF RICE PARAMETER LOOKUP TABLE

CROSS-REFERENCE TO RELATED APPLICATION

This application claims priority from 35 U.S.C. § 119 to U.S. Provisional Application No. 62/863,972, filed on Jun. 20, 2019, in the United States Patent & Trademark Office, the disclosure of which is incorporated herein by reference in its entirety.

FIELD

The disclosed subject matter relates to video coding and decoding, and more specifically, to methods for unifying two lookup tables into one lookup table for the determination of Rice parameter for the encoding of residual subblock with and without transform skip.

BACKGROUND

ITU-T VCEG (Q6/16) and ISO/IEC MPEG (JTC 1/SC 29/WG 11) published the H.265/HEVC (High Efficiency Video Coding) standard in 2013 (version 1) 2014 (version 2) 2015 (version 3) and 2016 (version 4). Since then, there has been exploration of the potential need for standardization of future video coding technology with a compression capability that significantly exceeds that of the High Efficiency Video Coding (HEVC) standard, including its extensions. In October 2017, the Joint Call for Proposals on Video Compression with Capability beyond HEVC (CfP) was issued. By Feb. 15, 2018, total 22 CfP responses on standard dynamic range (SDR), 12 CfP responses on high dynamic range (HDR), and 12 CfP responses on 360 video categories were submitted, respectively. In April 2018, all received CfP responses were evaluated in the 122 MPEG/10$^{th}$ Joint Video Exploration Team—Joint Video Expert Team (JVET) meeting. With careful evaluation, JVET formally launched the standardization of next-generation video coding beyond HEVC, for example Versatile Video Coding (VVC).

SUMMARY

According to an embodiment, a method of selecting a Rice parameter for encoding a video bitstream using at least one processor includes obtaining an absolute level corresponding to a current transform block; determining whether transform skip is enabled; generating a lookup variable based on the absolute level and the determination of whether the transform skip is enabled; obtaining the Rice parameter from a lookup table based on the lookup variable; and encoding a residual subblock based on the Rice parameter.

According to an embodiment, a device for selecting a Rice parameter for encoding a video bitstream, the device includes at least one memory configured to store program code; and at least one processor configured to read the program code and operate as instructed by the program code, the program code including: first obtaining code configured to cause the at least one processor to obtain an absolute level corresponding to a current transform block; determining code configured to cause the at least one processor to determine whether transform skip is enabled; generating code configured to cause the at least one processor to generate a lookup variable based on the absolute level and the determination of whether the transform skip is enabled; second obtaining code configured to cause the at least one processor to obtain the Rice parameter from a lookup table based on the lookup variable; and encoding code configured to cause the at least one processor to encode a residual subblock based on the Rice parameter.

According to an embodiment, a non-transitory computer-readable medium storing instructions, the instructions comprising: one or more instructions that, when executed by one or more processors of a device for selecting a Rice parameter for encoding a video bitstream, cause the one or more processors to: obtain an absolute level corresponding to a current transform block; determine whether transform skip is enabled; generate a lookup variable based on the absolute level and the determination of whether the transform skip is enabled; obtain the Rice parameter from a lookup table based on the lookup variable; and encode a residual subblock based on the Rice parameter.

BRIEF DESCRIPTION OF THE DRAWINGS

Further features, the nature, and various advantages of the disclosed subject matter will be more apparent from the following detailed description and the accompanying drawings in which:

FIG. 7 is a flowchart of an example process for selecting a Rice parameter for encoding a video bitstream in accordance with an embodiment.

FIG. 8 is a schematic illustration of a computer system in accordance with an embodiment.

DETAILED DESCRIPTION

In VVC Draft 5, two different rice parameter lookup tables are used to determine the Rice parameter for residual coding. One table is used when transform skip is enabled and another table is used when transform skip is disabled. To reduce memory usage, it is desirable to use only one lookup table independent on transform skip.

In VVC Draft 5, the rice parameter in the lookup table for transform skip has an integer dynamic range of 0 to 2. To make the table more responsive to wider changes in the value of residual coding, it is desirable to increase the dynamic range of the value in the lookup table.

Embodiments of the present disclosure may reduce the number of lookup table for the determination of Rice parameter for the encoding of residual subblock in VVC Draft 5.

Embodiments may be used separately or combined in any order. Further, each of the embodiments such as encoders and decoders, and any other embodiments, may be implemented by processing circuitry, for example one or more processors or one or more integrated circuits. In one example, the one or more processors may execute a program that is stored in a non-transitory computer-readable medium.

In embodiments, only one Rice parameter lookup table may be used independently on transform skip. In addition, the dynamic range of the Rice parameter for transform skip may be extended to a range of 0 to 3. Consequently, the memory usage may be reduced, and the text description of the process may be simplified.

Figure 1:
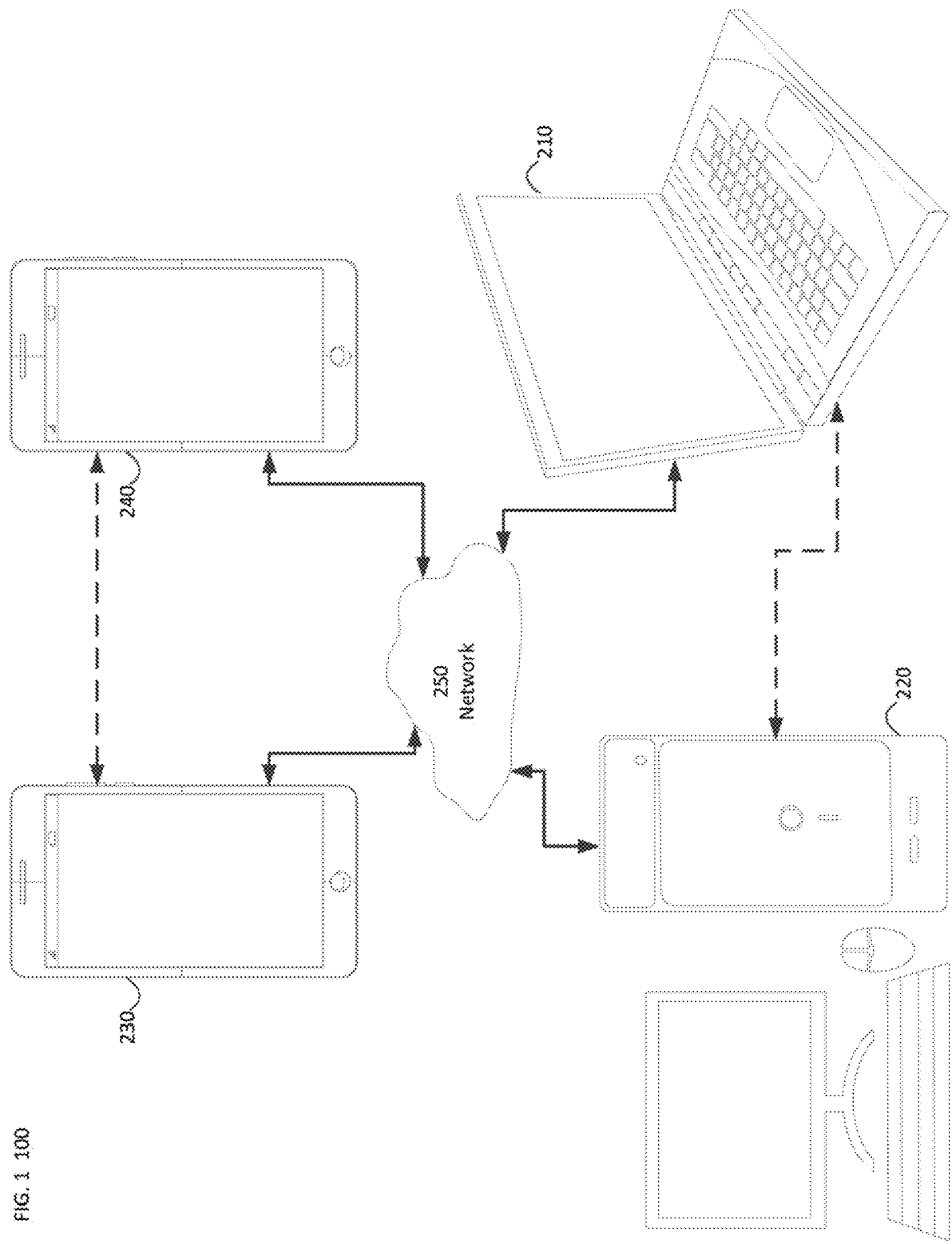
FIG. 1 is a schematic illustration of a simplified block diagram of a communication system in accordance with an embodiment.

FIG. 1 illustrates a simplified block diagram of a communication system (100) according to an embodiment of the present disclosure. The system (100) may include at least two terminals (110-120) interconnected via a network (150). For unidirectional transmission of data, a first terminal (110) may code video data at a local location for transmission to the other terminal (120) via the network (150). The second terminal (120) may receive the coded video data of the other terminal from the network (150), decode the coded data and display the recovered video data. Unidirectional data transmission may be common in media serving applications and the like.

FIG. 1 illustrates a second pair of terminals (130, 140) provided to support bidirectional transmission of coded video that may occur, for example, during videoconferencing. For bidirectional transmission of data, each terminal (130, 140) may code video data captured at a local location for transmission to the other terminal via the network (150). Each terminal (130, 140) also may receive the coded video data transmitted by the other terminal, may decode the coded data and may display the recovered video data at a local display device.

In FIG. 1, the terminals (110-140) may be illustrated as servers, personal computers and smart phones but the principles of the present disclosure may be not so limited. Embodiments of the present disclosure find application with laptop computers, tablet computers, media players and/or dedicated video conferencing equipment. The network (150) represents any number of networks that convey coded video data among the terminals (110-140), including for example wireline and/or wireless communication networks. The communication network (150) may exchange data in circuit-switched and/or packet-switched channels. Representative networks include telecommunications networks, local area networks, wide area networks and/or the Internet. For the purposes of the present discussion, the architecture and topology of the network (150) may be immaterial to the operation of the present disclosure unless explained herein below.

Figure 2:
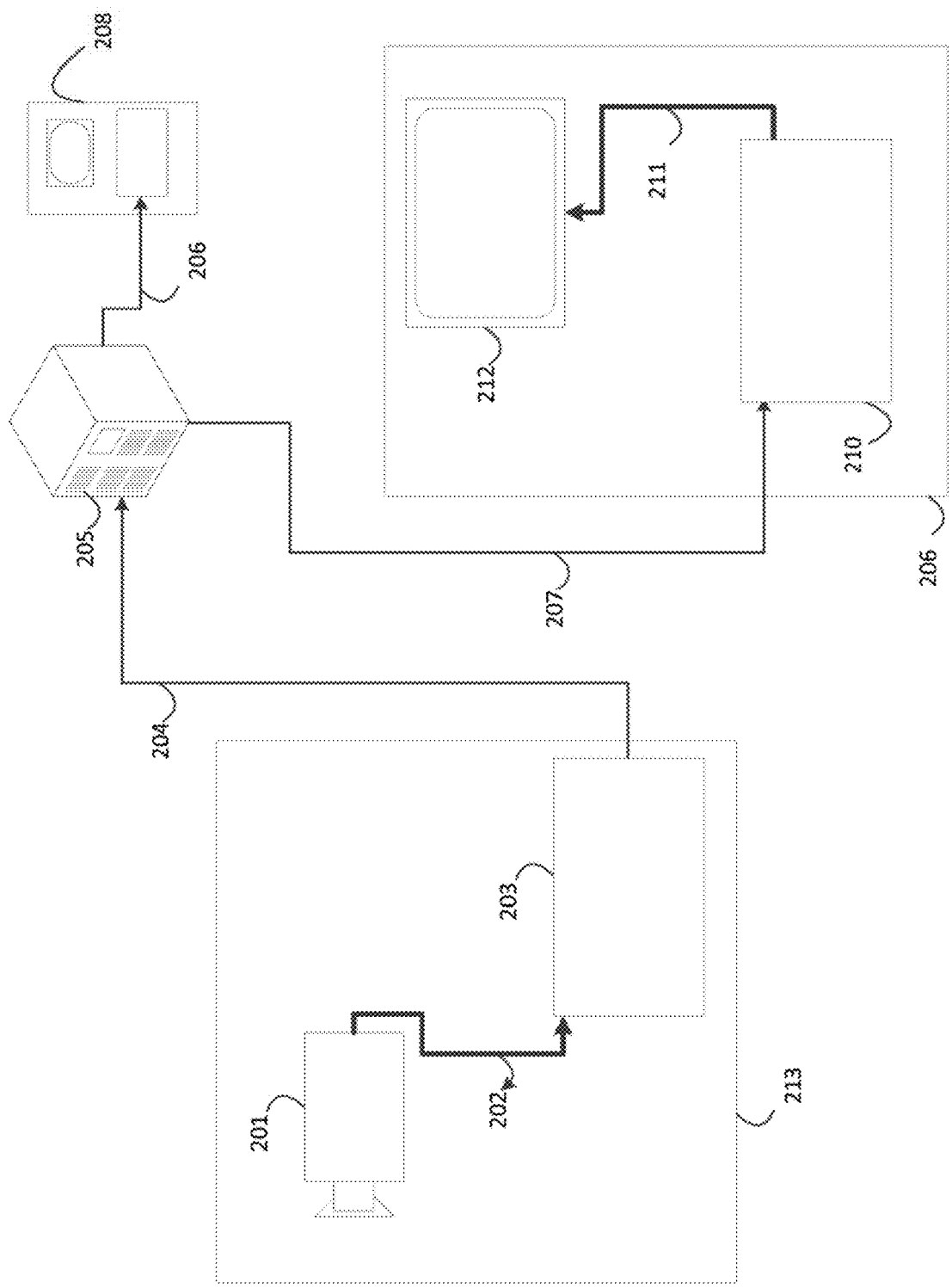
FIG. 2 is a schematic illustration of a simplified block diagram of a communication system in accordance with an embodiment.

FIG. 2 illustrates, as an example for an application for the disclosed subject matter, the placement of a video encoder and decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (213), that can include a video source (201), for example a digital camera, creating a for example uncompressed video sample stream (202). That sample stream (202), depicted as a bold line to emphasize a high data volume when compared to encoded video bitstreams, can be processed by an encoder (203) coupled to the camera (201). The encoder (203) can include hardware, software, or a combination thereof to enable or implement aspects of the disclosed subject matter as described in more detail below. The encoded video bitstream (204), depicted as a thin line to emphasize the lower data volume when compared to the sample stream, can be stored on a streaming server (205) for future use. One or more streaming clients (206, 208) can access the streaming server (205) to retrieve copies (207, 209) of the encoded video bitstream (204). A client (206) can include a video decoder (210) which decodes the incoming copy of the encoded video bitstream (207) and creates an outgoing video sample stream (211) that can be rendered on a display (212) or other rendering device (not depicted). In some streaming systems, the video bitstreams (204, 207, 209) can be encoded according to certain video coding/compression standards. Examples of those standards include ITU-T Recommendation H.265. Under development is a video coding standard informally known as Versatile Video Coding or VVC. The disclosed subject matter may be used in the context of VVC.

Figure 3:
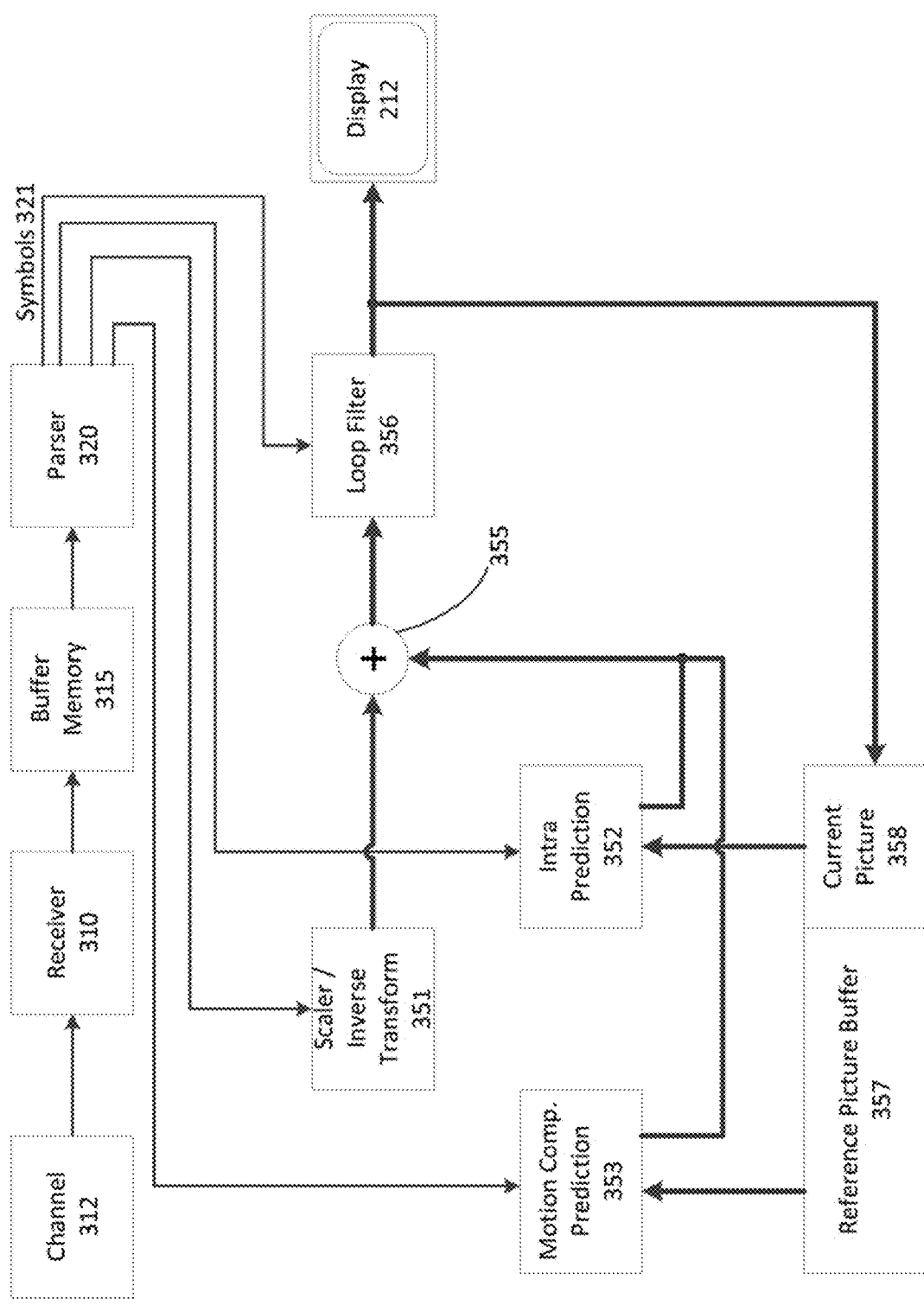
FIG. 3 is a schematic illustration of a simplified block diagram of a decoder in accordance with an embodiment.

FIG. 3 may be a functional block diagram of a video decoder (210) according to an embodiment of the present disclosure.

A receiver (310) may receive one or more codec video sequences to be decoded by the decoder (210); in the same or another embodiment, one coded video sequence at a time, where the decoding of each coded video sequence is independent from other coded video sequences. The coded video sequence may be received from a channel (312), which may be a hardware/software link to a storage device which stores the encoded video data. The receiver (310) may receive the encoded video data with other data, for example, coded audio data and/or ancillary data streams, that may be forwarded to their respective using entities (not depicted). The receiver (310) may separate the coded video sequence from the other data. To combat network jitter, a buffer memory (315) may be coupled in between receiver (310) and entropy decoder/parser (320) ("parser" henceforth). When receiver (310) is receiving data from a store/forward device of sufficient bandwidth and controllability, or from an isosynchronous network, the buffer (315) may not be needed, or can be small. For use on best effort packet networks such as the Internet, the buffer (315) may be required, can be comparatively large and can advantageously of adaptive size.

The video decoder (210) may include a parser (320) to reconstruct symbols (321) from the entropy coded video sequence. Categories of those symbols include information used to manage operation of the decoder (210), and potentially information to control a rendering device such as a display (212) that is not an integral part of the decoder but can be coupled to it, as was shown in FIG. 3. The control information for the rendering device(s) may be in the form of Supplementary Enhancement Information (SEI messages) or Video Usability Information (VUI) parameter set fragments (not depicted). The parser (320) may parse/entropy-decode the coded video sequence received. The coding of the coded video sequence can be in accordance with a video coding technology or standard, and can follow principles well known to a person skilled in the art, including variable length coding, Huffman coding, arithmetic coding with or without context sensitivity, and so forth. The parser (320) may extract from the coded video sequence, a set of subgroup parameters for at least one of the subgroups of pixels in the video decoder, based upon at least one parameter corresponding to the group. Subgroups can include Groups of Pictures (GOPs), pictures, sub-pictures, tiles, slices, bricks, macroblocks, Coding Tree Units (CTUs) Coding Units (CUs), blocks, Transform Units (TUs), Prediction Units (PUs) and so forth. A tile may indicate a rectangular region of CU/CTUs within a particular tile column and row in a picture. A brick may indicate a rectangular region of CU/CTU rows within a particular tile. A slice may indicate one or more bricks of a picture, which are contained in an NAL unit. A sub-picture may indicate an rectangular region of one or more slices in a picture. The entropy decoder/parser may also extract from the coded video sequence information such as transform coefficients, quantizer parameter values, motion vectors, and so forth.

The parser (320) may perform entropy decoding/parsing operation on the video sequence received from the buffer (315), so to create symbols (321).

Reconstruction of the symbols (321) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (320). The flow of such subgroup control information between the parser (320) and the multiple units below is not depicted for clarity.

Beyond the functional blocks already mentioned, decoder 210 can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (351). The scaler/inverse transform unit (351) receives quantized transform coefficient as well as control information, including which transform to use, block size, quantization factor, quantization scaling matrices, etc. as symbol(s) (321) from the parser (320). It can output blocks comprising sample values, that can be input into aggregator (355).

In some cases, the output samples of the scaler/inverse transform (351) can pertain to an intra coded block; that is: a block that is not using predictive information from previously reconstructed pictures, but can use predictive information from previously reconstructed parts of the current picture. Such predictive information can be provided by an intra picture prediction unit (352). In some cases, the intra picture prediction unit (352) generates a block of the same size and shape of the block under reconstruction, using surrounding already reconstructed information fetched from the current (partly reconstructed) picture (358). The aggregator (355), in some cases, adds, on a per sample basis, the prediction information the intra prediction unit (352) has generated to the output sample information as provided by the scaler/inverse transform unit (351).

In other cases, the output samples of the scaler/inverse transform unit (351) can pertain to an inter coded, and potentially motion compensated block. In such a case, a Motion Compensation Prediction unit (353) can access reference picture memory (357) to fetch samples used for prediction. After motion compensating the fetched samples in accordance with the symbols (321) pertaining to the block, these samples can be added by the aggregator (355) to the output of the scaler/inverse transform unit (in this case called the residual samples or residual signal) so to generate output sample information. The addresses within the reference picture memory form where the motion compensation unit fetches prediction samples can be controlled by motion vectors, available to the motion compensation unit in the form of symbols (321) that can have, for example X, Y, and reference picture components. Motion compensation also can include interpolation of sample values as fetched from the reference picture memory when sub-sample exact motion vectors are in use, motion vector prediction mechanisms, and so forth.

The output samples of the aggregator (355) can be subject to various loop filtering techniques in the loop filter unit (356). Video compression technologies can include in-loop filter technologies that are controlled by parameters included in the coded video bitstream and made available to the loop filter unit (356) as symbols (321) from the parser (320), but can also be responsive to meta-information obtained during the decoding of previous (in decoding order) parts of the coded picture or coded video sequence, as well as responsive to previously reconstructed and loop-filtered sample values.

The output of the loop filter unit (356) can be a sample stream that can be output to the render device (212) as well as stored in the reference picture memory for use in future inter-picture prediction.

Certain coded pictures, once fully reconstructed, can be used as reference pictures for future prediction. Once a coded picture is fully reconstructed and the coded picture has been identified as a reference picture (by, for example, parser (320)), the current reference picture (358) can become part of the reference picture buffer (357), and a fresh current picture memory can be reallocated before commencing the reconstruction of the following coded picture.

The video decoder 210 may perform decoding operations according to a predetermined video compression technology that may be documented in a standard, such as ITU-T Rec. H.265. The coded video sequence may conform to a syntax specified by the video compression technology or standard being used, in the sense that it adheres to the syntax of the video compression technology or standard, as specified in the video compression technology document or standard and specifically in the profiles document therein. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (310) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example temporal, spatial, or SNR enhancement layers, redundant slices, redundant pictures, forward error correction codes, and so on.

Figure 4:
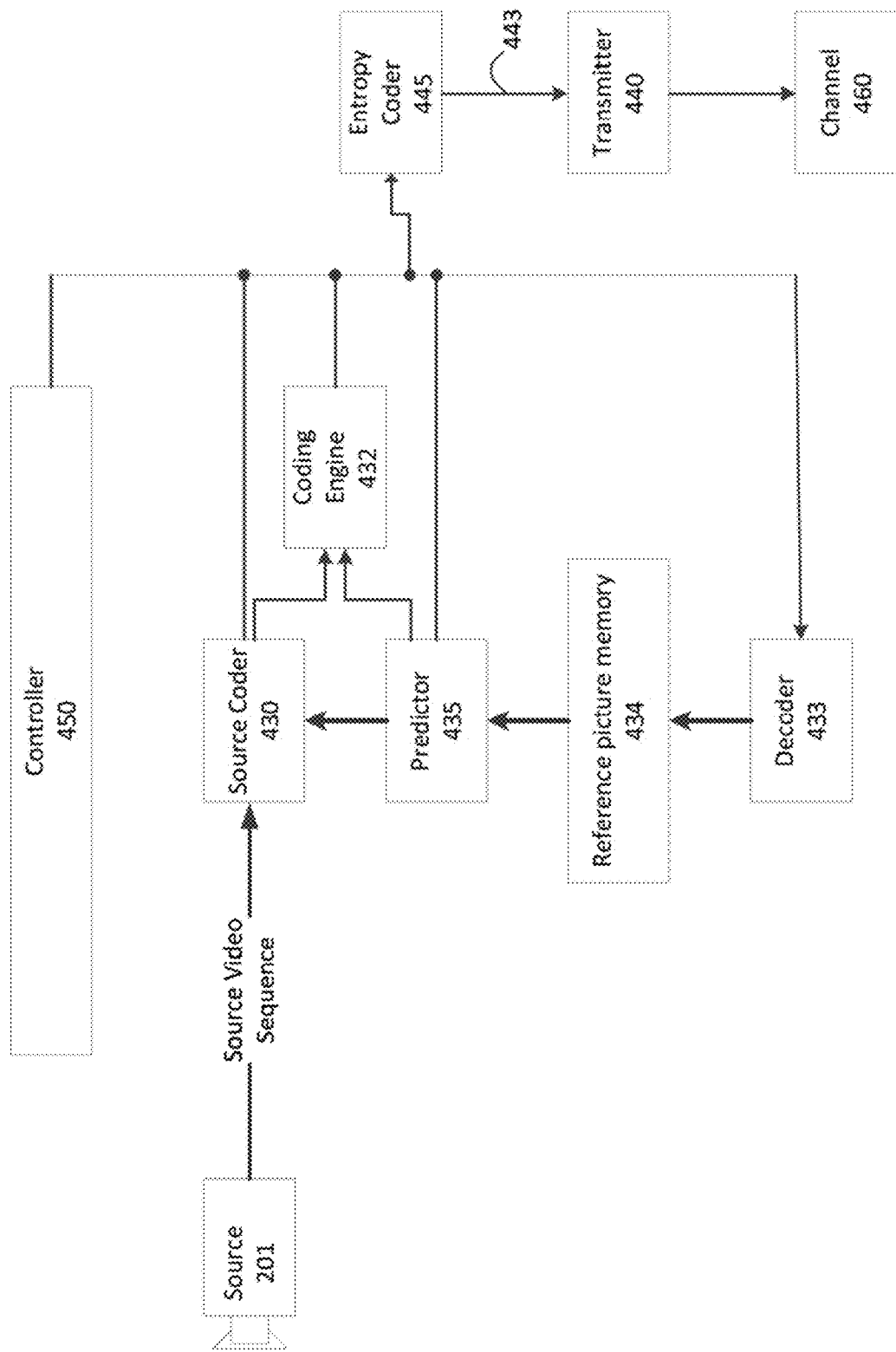
FIG. 4 is a schematic illustration of a simplified block diagram of an encoder in accordance with an embodiment.

FIG. 4 may be a functional block diagram of a video encoder (203) according to an embodiment of the present disclosure.

The encoder (203) may receive video samples from a video source (201) (that is not part of the encoder) that may capture video image(s) to be coded by the encoder (203).

The video source (201) may provide the source video sequence to be coded by the encoder (203) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source (201) may be a storage device storing previously prepared video.

In a videoconferencing system, the video source (203) may be a camera that captures local image information as a video sequence. Video data may be provided as a plurality of individual pictures that impart motion when viewed in sequence. The pictures themselves may be organized as a spatial array of pixels, wherein each pixel can comprise one or more sample depending on the sampling structure, color space, etc. in use. A person skilled in the art can readily understand the relationship between pixels and samples. The description below focusses on samples.

According to an embodiment, the encoder (203) may code and compress the pictures of the source video sequence into a coded video sequence (443) in real time or under any other time constraints as required by the application. Enforcing appropriate coding speed is one function of Controller (450). Controller controls other functional units as described below and is functionally coupled to these units. The coupling is not depicted for clarity. Parameters set by controller can include rate control related parameters (picture skip, quantizer, lambda value of rate-distortion optimization techniques, . . . ), picture size, group of pictures (GOP) layout, maximum motion vector search range, and so forth. A person skilled in the art can readily identify other functions of controller (450) as they may pertain to video encoder (203) optimized for a certain system design.

Some video encoders operate in what a person skilled in the are readily recognizes as a "coding loop". As an oversimplified description, a coding loop can consist of the encoding part of an encoder (430) ("source coder" henceforth) (responsible for creating symbols based on an input picture to be coded, and a reference picture(s)), and a (local) decoder (433) embedded in the encoder (203) that reconstructs the symbols to create the sample data a (remote) decoder also would create (as any compression between symbols and coded video bitstream is lossless in the video compression technologies considered in the disclosed subject matter). That reconstructed sample stream is input to the reference picture memory (434). As the decoding of a symbol stream leads to bit-exact results independent of decoder location (local or remote), the reference picture buffer content is also bit exact between local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is well known to a person skilled in the art.

The operation of the "local" decoder (433) can be the same as of a "remote" decoder (210), which has already been described in detail above in conjunction with FIG. 3. Briefly referring also to FIG. 4, however, as symbols are available and en/decoding of symbols to a coded video sequence by entropy coder (445) and parser (320) can be lossless, the entropy decoding parts of decoder (210), including channel (312), receiver (310), buffer (315), and parser (320) may not be fully implemented in local decoder (433).

An observation that can be made at this point is that any decoder technology except the parsing/entropy decoding that is present in a decoder also necessarily needs to be present, in substantially identical functional form, in a corresponding encoder. For this reason, the disclosed subject matter focusses on decoder operation. The description of encoder technologies can be abbreviated as they are the inverse of the comprehensively described decoder technologies. Only in certain areas a more detail description is required and provided below.

As part of its operation, the source coder (430) may perform motion compensated predictive coding, which codes an input frame predictively with reference to one or more previously-coded frames from the video sequence that were designated as "reference frames." In this manner, the coding engine (432) codes differences between pixel blocks of an input frame and pixel blocks of reference frame(s) that may be selected as prediction reference(s) to the input frame.

The local video decoder (433) may decode coded video data of frames that may be designated as reference frames, based on symbols created by the source coder (430). Operations of the coding engine (432) may advantageously be lossy processes. When the coded video data may be decoded at a video decoder (not shown in FIG. 4), the reconstructed video sequence typically may be a replica of the source video sequence with some errors. The local video decoder (433) replicates decoding processes that may be performed by the video decoder on reference frames and may cause reconstructed reference frames to be stored in the reference picture cache (434). In this manner, the encoder (203) may store copies of reconstructed reference frames locally that have common content as the reconstructed reference frames that will be obtained by a far-end video decoder (absent transmission errors).

The predictor (435) may perform prediction searches for the coding engine (432). That is, for a new frame to be coded, the predictor (435) may search the reference picture memory (434) for sample data (as candidate reference pixel blocks) or certain metadata such as reference picture motion vectors, block shapes, and so on, that may serve as an appropriate prediction reference for the new pictures. The predictor (435) may operate on a sample block-by-pixel block basis to find appropriate prediction references. In some cases, as determined by search results obtained by the predictor (435), an input picture may have prediction references drawn from multiple reference pictures stored in the reference picture memory (434).

The controller (450) may manage coding operations of the video coder (430), including, for example, setting of parameters and subgroup parameters used for encoding the video data.

Output of all aforementioned functional units may be subjected to entropy coding in the entropy coder (445). The entropy coder translates the symbols as generated by the various functional units into a coded video sequence, by loss-less compressing the symbols according to technologies known to a person skilled in the art as, for example Huffman coding, variable length coding, arithmetic coding, and so forth.

The transmitter (440) may buffer the coded video sequence(s) as created by the entropy coder (445) to prepare it for transmission via a communication channel (460), which may be a hardware/software link to a storage device which would store the encoded video data. The transmitter (440) may merge coded video data from the video coder (430) with other data to be transmitted, for example, coded audio data and/or ancillary data streams (sources not shown).

The controller (450) may manage operation of the encoder (203). During coding, the controller (450) may assign to each coded picture a certain coded picture type, which may affect the coding techniques that may be applied to the respective picture. For example, pictures often may be assigned as one of the following frame types:

An Intra Picture (I picture) may be one that may be coded and decoded without using any other frame in the sequence as a source of prediction. Some video codecs allow for different types of Intra pictures, including, for example Independent Decoder Refresh Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predicatively with reference to other (already coded) blocks as determined by the coding assignment applied to the blocks' respective pictures. For example, blocks of t pictures may be coded non-predicatively or they may be coded predicatively with reference to already coded blocks of the same picture (spatial prediction or intra prediction). Pixel blocks of P pictures may be coded non-predicatively, via spatial prediction or via temporal prediction with reference to one previously coded reference pictures. Blocks of B pictures may be coded non-predicatively, via spatial prediction or via temporal prediction with reference to one or two previously coded reference pictures.

The video coder (203) may perform coding operations according to a predetermined video coding technology or standard, such as ITU-T Rec. H.265. In its operation, the video coder (203) may perform various compression operations, including predictive coding operations that exploit temporal and spatial redundancies in the input video sequence. The coded video data, therefore, may conform to a syntax specified by the video coding technology or standard being used.

In an embodiment, the transmitter (440) may transmit additional data with the encoded video. The video coder (430) may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

Below is described a Rice parameter derivation process in VVC Draft 5 using two lookup tables, according to an embodiment. Inputs to this process are the base level baseLevel, the color component index cdx, the luma location (x0, y0) specifying the top-left sample of the current transform block relative to the top-left sample of the current picture, the current coefficient scan location (xC, yC), the binary logarithm of the transform block width log 2TbWidth, and the binary logarithm of the transform block height log 2TbHeight. The output of this process is the Rice parameter cRiceParam.

Given the array AbsLevel[x][y] for the transform block with component index cdx and the top-left luma location (x0, y0), the variable locSumAbs may be derived as specified by the following pseudocode:

```
if transform_skip_flag[ x0 ][ y0 ] is equal to 1, trafoSkip is set equal to
1 and the following applies:
   locSumAbs2 = 0
   if( xC > 0 )
      locSumAbs2 += AbsLevel[ xC - 1 ][ yC ]
   if( yC > 0 )
      locSumAb2s += AbsLevel[ xC ][ yC - 1 ]
   locSumAbs = Clip3( 0, 31, locSumAbs2 )
Otherwise (transform_skip_flag[ x0 ][ y0 ] is equal to 0), trafoSkip is
set to 0 and the following applies:
   locSumAbs5 = 0
   if( xC < (1 << log2TbWidth) - 1 ) {
      locSumAbs5 += AbsLevel[ xC + 1 ][ yC ]
      if( xC < (1 << log2TbWidth) - 2 )
         locSumAbs5 += AbsLevel[ xC + 2 ][ yC ]
      if( yC < (1 << log2TbHeight) - 1 )
         locSumAbs5 += AbsLevel[ xC + 1 ][ yC + 1 ]
   }
   if( yC < (1 << log2TbHeight) - 1 ) {
      locSumAbs5 += AbsLevel[ xC ][ yC + 1 ]
      if( yC < (1 << log2TbHeight) - 2 )
         locSumAbs5 += AbsLevel [ xC ][ yC + 2 ]
   }
   locSumAbs = Clip3( 0, 31, locSumAbs5 - baseLevel * 5 )
```

If baseLevel is equal to 0, the variable s is set equal to Max(0, QState−1) and given the variables locSumAbs and s, the Rice parameter cRiceParam and the variable ZeroPos[n] are derived as specified in Table 1. Otherwise (baseLevel is greater than 0), given the variables locSumAbs and trafoSkip, the Rice parameter cRiceParam is derived as specified in Table 1.

TABLE 1

Specification of cRiceParam and ZeroPost[ n ] based on locSumAbs, trafoSkip and s

| trafoSkip | s | locSumAbs | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|---|
| 0 |   | cRiceParam | 0 | 0 | 0 | 0 | 0 | 0 | 0 | 1 | 1 | 1 | 1 | 1 | 1 | 1 | 2 | 2 |
| 1 |   | cRiceParam | 0 | 0 | 0 | 0 | 0 | 0 | 0 | 0 | 0 | 0 | 0 | 0 | 1 | 1 | 1 | 1 |
|   | 0 | ZeroPos[ n ] | 0 | 0 | 0 | 0 | 0 | 1 | 2 | 2 | 2 | 2 | 2 | 2 | 4 | 4 | 4 | 4 |
|   | 1 | ZeroPos[ n ] | 1 | 1 | 1 | 1 | 2 | 3 | 4 | 4 | 4 | 6 | 6 | 6 | 8 | 8 | 8 | 8 |
|   | 2 | ZeroPos[ n ] | 1 | 1 | 2 | 2 | 2 | 3 | 4 | 4 | 4 | 6 | 6 | 6 | 8 | 8 | 8 | 8 |
|   |   | locSumAbs | 16 | 17 | 18 | 19 | 20 | 21 | 22 | 23 | 24 | 25 | 26 | 27 | 28 | 29 | 30 | 31 |
| 0 |   | cRiceParam | 2 | 2 | 2 | 2 | 2 | 2 | 2 | 2 | 2 | 2 | 2 | 2 | 3 | 3 | 3 | 3 |
| 1 |   | cRiceParam | 1 | 1 | 1 | 1 | 1 | 1 | 1 | 1 | 1 | 2 | 2 | 2 | 2 | 2 | 2 | 2 |
|   | 0 | ZeroPos[ n ] | 4 | 4 | 4 | 4 | 4 | 4 | 8 | 8 | 8 | 8 | 8 | 16 | 16 | 16 | 16 | 16 |
|   | 1 | ZeroPos[ n ] | 4 | 4 | 12 | 12 | 12 | 12 | 12 | 12 | 12 | 16 | 16 | 16 | 16 | 16 | 16 | 16 |
|   | 2 | ZeroPos[ n ] | 8 | 8 | 12 | 12 | 12 | 12 | 12 | 12 | 16 | 16 | 16 | 16 | 16 | 16 | 16 | 16 |

As shown in Table 1, two different lookup tables are used to determine the Rice parameter cRiceParam. In particular, the two tables are documented in the four rows in Table 9-12 containing the entry cRiceParam. One of the tables is selected by the value of trafoSkip, which indicates whether transform skip is enabled or disabled.

Figure 5:
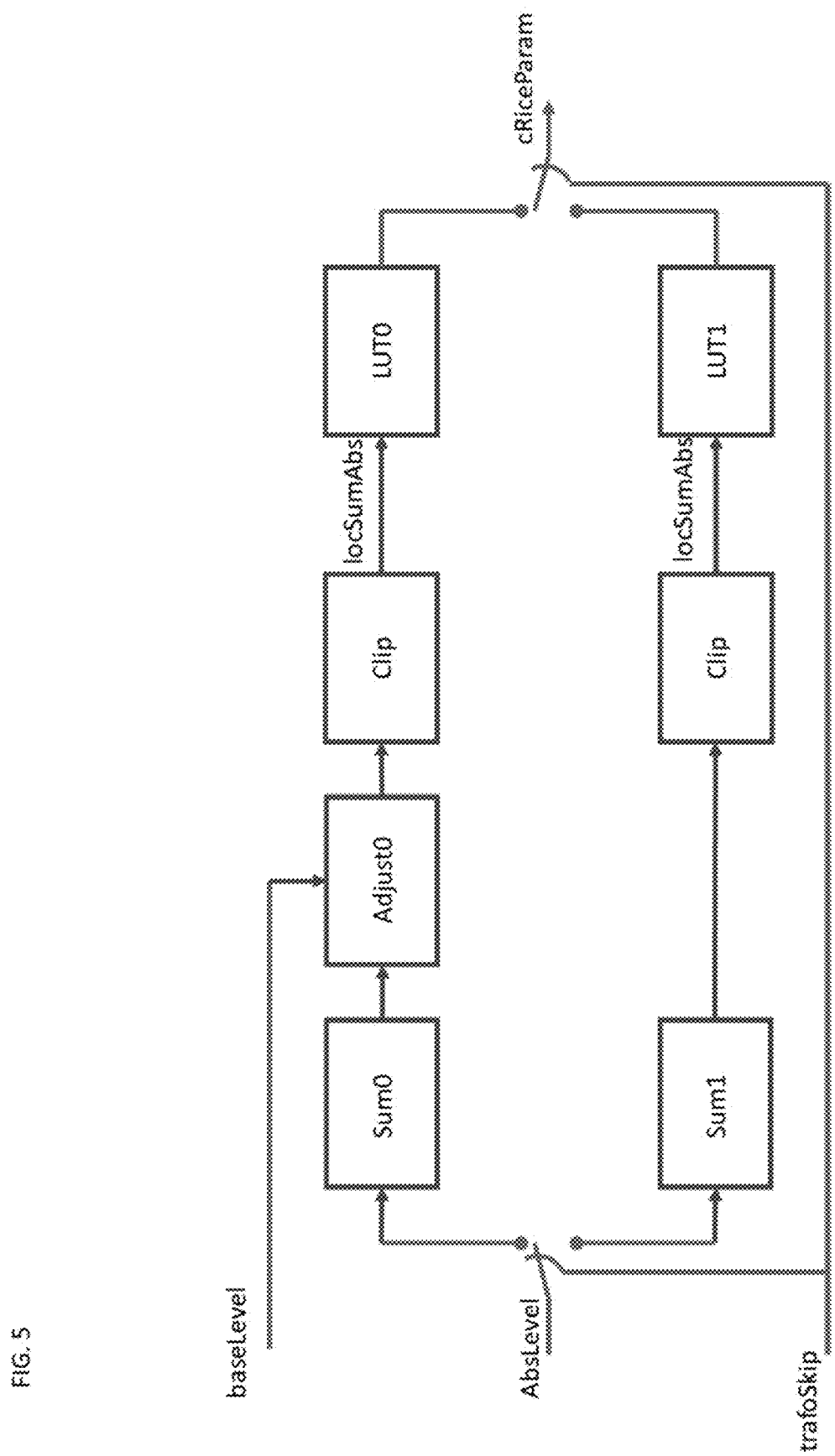
FIG. 5 is a schematic illustration of a flow diagram showing an example of a selection of a Rice parameter in accordance with an embodiment.

FIG. 5 illustrates a flow diagram in which a Rice parameter is determined using two lookup tables, LUT0 and LUT1, as discussed above. LUT1 is used with transform skip, otherwise LUT0 is used without transform skip.

When transform skip is not activated, the absolute level is pass to Sum0 which calculates locSumAbs5. Then locSumAbs5 is modified by Adjus0 and clipped to between 0 and 31 with baseLevel as input to produce locSumAbs, as shown below in Equation 1.

locSumAbs=Clip3(0,31,locSumAbs5−baseLevel*5)  (Equation 1)

Equation 1 may be used as input to the lookup table LUT0 to determine the rice parameter cRiceParam.

When transform skip is activated, the absolute level is pass to Sum1 which calculates locSumAbs2. Then locSumAbs2 is clipped to between 0 and 31 to produce locSumAbs, as shown below in Equation 2.

locSumAbs=Clip3(0,31,locSumAbs2)  (Equation 2)

Equation 2 may be used as input to the lookup table LUT1 to determine the rice parameter cRiceParam.

Below is described a Rice parameter derivation process using a single lookup table, according to an embodiment. Inputs to this process are the base level baseLevel, the color component index cIdx, the luma location (x0, y0) specifying the top-left sample of the current transform block relative to the top-left sample of the current picture, the current coefficient scan location (xC, yC), the binary logarithm of the transform block width log 2TbWidth, and the binary logarithm of the transform block height log 2TbHeight. The output of this process is the Rice parameter cRiceParam.

Given the array AbsLevel[x][y] for the transform block with component index cIdx and the top-left luma location (x0, y0), the variable locSumAbs is derived as specified by the following pseudocode:

```
If transform_skip_flag[ x0 ][ y0 ] is equal to 1, the following applies:
  locSumAbs2 = 0
  if( xC > 0 )
    locSumAbs2 += AbsLevel[ xC − 1 ][ yC ]
  if( yC > 0)
    locSumAbs2 += AbsLevel[ xC ][ yC − 1 ]
  locSumAbs = Clip3( 0, 31, (locSumAbs2 >>1) + 1 )
Otherwise (transform_skip_flag[ x0 ][ y0 ] is equal to 0), the following
applies:
```

```
  locSumAbs5 = 0
  if( xC < (1 << log2TbWidth) − 1 ) {
    locSumAbs5 += AbsLevel[ xC + 1 ][ yC]
    if( xC < (1 << log2TbWidth) − 2 )
      locSumAbs5 += AbsLevel[ xC + 2 ][ yC ]
    if( yC < (1 << log2TbHeight) − 1 )
      locSumAbs5 += AbsLevel[ xC + 1 ][ yC + 1 ]
  }
  if( yC < (1 << log2TbHeight) − 1 ) {
    locSumAbs5 += AbsLevel[ xC ][ yC + 1 ]
    if( yC < (1 << log2TbHeight) − 2 )
      locSumAbs5s += AbsLevel [ xC ][ yC + 2 ]
  }
  locSumAbs = Clip3( 0, 31, locSumAbs5 − baseLevel * 5)
```

If baseLevel is equal to 0, the variable s is set equal to Max(0, QState−1) and given the variables locSumAbs and s, the Rice parameter cRiceParam and the variable ZeroPos[n] are derived as specified in Table 2. Otherwise (baseLevel is greater than 0), given the variables locSumAbs and trafoSkip, the Rice parameter cRiceParam is derived as specified in Table 2.

TABLE 2

| | Specification of cRiceParam and ZeroPos[ n ] based on locSumAbs and s | | | | | | | | | | | | | | | |
|---|---|---|---|---|---|---|---|---|---|---|---|---|---|---|---|---|
| s | locSumAbs | 0 | 1 | 2 | 3 | 4 | 5 | 6 | 7 | 8 | 9 | 10 | 11 | 12 | 13 | 14 | 15 |
| | cRiceParam | 0 | 0 | 0 | 0 | 0 | 0 | 0 | 0 | 0 | 0 | 0 | 0 | 1 | 1 | 1 | 1 |
| 0 | ZeroPos[ n ] | 0 | 0 | 0 | 0 | 0 | 1 | 2 | 2 | 2 | 2 | 2 | 2 | 4 | 4 | 4 | 4 |
| 1 | ZeroPos[ n ] | 1 | 1 | 1 | 1 | 2 | 3 | 4 | 4 | 4 | 6 | 6 | 6 | 8 | 8 | 8 | 8 |
| 2 | ZeroPos[ n ] | 1 | 1 | 2 | 2 | 2 | 3 | 4 | 4 | 4 | 6 | 6 | 6 | 8 | 8 | 8 | 8 |
| | locSumAbs | 16 | 17 | 18 | 19 | 20 | 21 | 22 | 23 | 24 | 25 | 26 | 27 | 28 | 29 | 30 | 31 |
| | cRiceParam | 1 | 1 | 1 | 1 | 1 | 1 | 1 | 1 | 1 | 2 | 2 | 2 | 2 | 2 | 2 | 2 |
| 0 | ZeroPos[ n ] | 4 | 4 | 4 | 4 | 4 | 4 | 4 | 8 | 8 | 8 | 8 | 16 | 16 | 16 | 16 | 16 |
| 1 | ZeroPos[ n ] | 4 | 4 | 12 | 12 | 12 | 12 | 12 | 12 | 12 | 12 | 16 | 16 | 16 | 16 | 16 | 16 |
| 2 | ZeroPos[ n ] | 8 | 8 | 12 | 12 | 12 | 12 | 12 | 12 | 12 | 16 | 16 | 16 | 16 | 16 | 16 | 16 |

As can be seen above, Table 2 has only two rows for cRiceParam and no column for trafoSkip. In contrast, Table 1 has four rows for cRiceParam and a column for trafoSkip. Therefore, memory usage may be reduced and the text description may be simplified.

Figure 6:
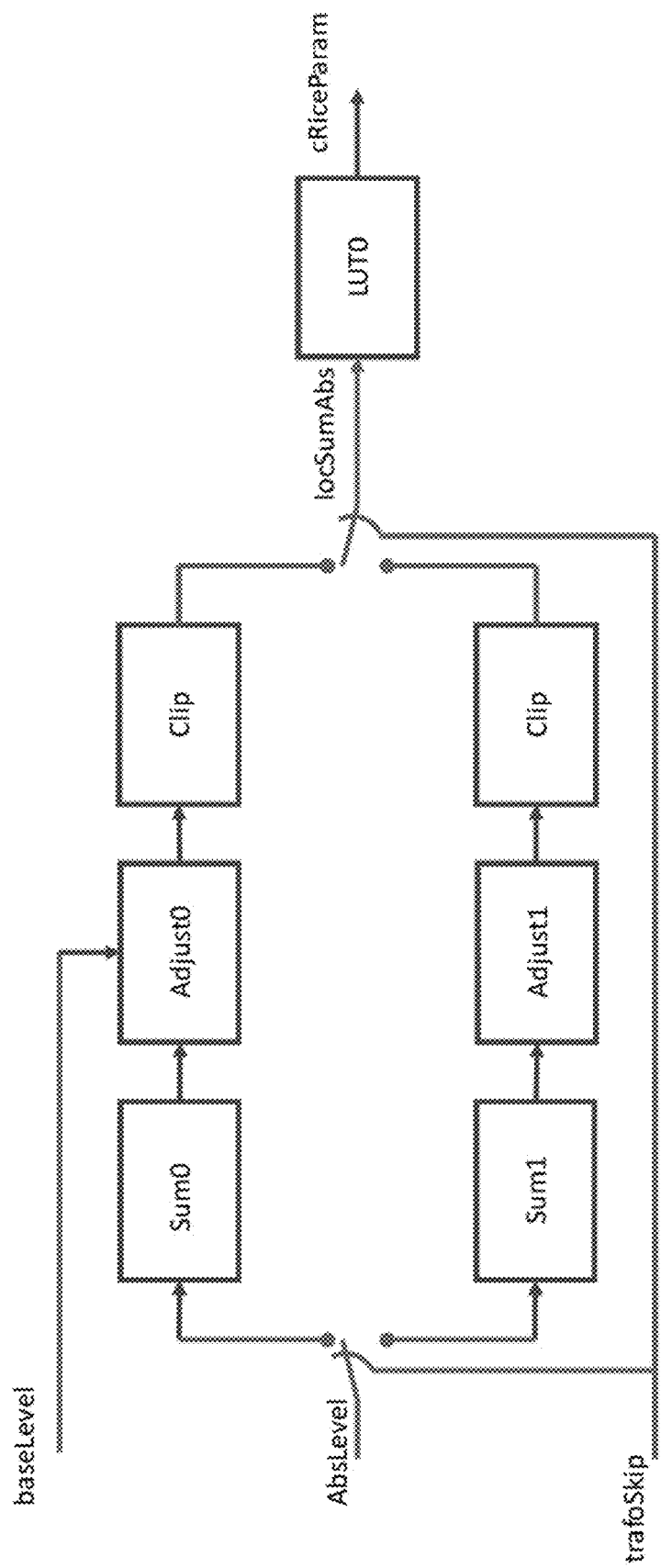
FIG. 6 is a schematic illustration of a flow diagram showing an example of a selection of a Rice parameter in accordance with an embodiment.

FIG. 6 illustrates a flow diagram in which a Rice parameter is determined using one lookup table, LUT0, independent of the status of transform skip.

When transform skip is not activated, the absolute level is pass to Sum0 which calculates locSumAbs5. Then locSumAbs5 is modified by Adjus0 and clipped to between 0 and 31 with baseLevel as input to produce locSumAbs, as shown in Equation 3 below.

locSumAbs=Clip3(0,31,locSumAbs5−baseLevel*5)  (Equation 3)

Equation 3 may be used as input to the look up table LUT0 to determine the rice parameter cRiceParam.

When transform skip is activated, the absolute level is pass to Sum1 which calculates locSumAbs2. Then locSumAbs2 is modified by Adjust1 and clipped to between 0 and 31 to produce locSumAbs, as shown in Equation 4 below.

locSumAbs=Clip3(0,31,(locSumAbs2>>1)+1)  (Equation 4)

Equation 4 may be used as input to the same look up table, LUT0, to determine the rice parameter cRiceParam. In this way, only one lookup table may be used, independently of the status of transform skip.

In an embodiment, the index for the Rice parameter lookup table may be determined using the following pseudocode:

```
locSumAbs = 0
if( xC > 0 )
    locSumAbs += AbsLevel[ xC − 1 ][ yC ]
if( yC > 0 )
    locSumAbs += AbsLevel[ xC ][ yC − 1 ]
locSumAbs = Clip3( 0, 31, (locSumAbs + offset) >>1 )
```

The offset may have a pre-determined value of 0, 1, or 2 for different rounding in the right shift by one operation. When offset is equal to 2, it is equivalent to embodiments described above.

For even value of the offset, the clipping operation may be implemented with the corresponding value of offset1=offset>>1 by the following pseudocode:

Clip3(0,31,(locSumAbs>>1)+offset1)

In an embodiment, the index for the Rice parameter lookup table may be determined using the following pseudocode without extending the dynamic range of the Rice parameter:

```
locSumAbs = 0
if( xC > 0 )
    locSumAbs += AbsLevel[ xC − 1 ][ yC ]
if( yC > 0 )
    locSumAbs += AbsLevel[ xC ][ yC − 1 ]
locSumAbs = Clip3( 0, 31, locSumAbs)
locSumAbs = (locSumAbs + offset) >>1 )
```

The offset may have a pre-determined value of 0, 1, or 2 for different rounding in the right shift by one operation.

For even value of offset, the offset operation can also be implemented with the corresponding value of offset1=offset>>1 by the following pseudocode:

locSumAbs=(locSumAbs>>1)+offset1

FIG. 7 is a flowchart is an example process 700 for selecting a Rice parameter for encoding a video bitstream using at least one processor. In some implementations, one or more process blocks of FIG. 7 may be performed by decoder 210. In some implementations, one or more process blocks of FIG. 7 may be performed by another device or a group of devices separate from or including decoder 210, such as encoder 203.

As shown in FIG. 7, process 700 may include obtaining an absolute level corresponding to a current transform block (block 710).

As further shown in FIG. 7, process 700 may include determining whether transform skip is enabled (block 720).

As further shown in FIG. 7, if transform skip is not enabled (NO at block 720), the process 700 may include generating an adjusted variable by adjusting the absolute level based on a base level corresponding to the current transform block (block 730) and generating a lookup variable by clipping the adjusted variable (block 740).

As further shown in FIG. 7, if transform skip is enabled (YES at block 720), the process 700 may include generating an adjusted variable by adjusting the absolute level (block 750) and generating a lookup variable by clipping the adjusted variable (block 760).

As further shown in FIG. 7, process 700 may include obtaining the Rice parameter from a lookup table based on the lookup variable (block 770).

As further shown in FIG. 7, process 700 may include encoding a residual subblock based on the Rice parameter (block 780).

In an embodiment, the lookup variable may be obtained from the lookup table when the transform skip is enabled and when the transform skip is disabled.

In an embodiment, based on the transform skip being enabled, an offset variable may be generated by applying an offset to the absolute level; and the lookup variable may instead be generated by clipping the offset variable.

In an embodiment, based on the transform skip being enabled, an adjusted variable may be generated by clipping the absolute level; and the lookup variable may instead be generated by applying an offset to the adjusted variable.

In an embodiment, the determination of whether the transform skip is enabled is performed based on a transform skip flag.

In an embodiment, the lookup variable may be determined based on at least one from among a base level corresponding to the current transform block, a color component index, a luma location specifying a top-left sample of the current transform block relative to a top-left sample of a current picture, a current coefficient scan location, a binary logarithm of a width of the current transform block, and a binary logarithm of a height of the current transform block.

In an embodiment, the Rice parameter may have a value between 0 and 2.

In an embodiment, the Rice parameter may have a value between 0 and 3.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

Further, the proposed methods may be implemented by processing circuitry (e.g., one or more processors or one or more integrated circuits). In one example, the one or more processors execute a program that is stored in a non-transitory computer-readable medium to perform one or more of the proposed methods.

The techniques described above, can be implemented as computer software using computer-readable instructions and physically stored in one or more computer-readable media. For example, FIG. 8 shows a computer system 800 suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 8 for computer system 800 are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system 800.

Computer system 800 may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 801, mouse 802, trackpad 803, touch screen 810 and associated graphics adapter 850, data-glove 1204, joystick 805, microphone 806, scanner 807, camera 808.

Computer system 800 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 810, data-glove 1204, or joystick 805, but there can also be tactile feedback devices that do not serve as input devices), audio output devices (such as: speakers 809, headphones (not depicted)), visual output devices (such as screens 810 to include cathode ray tube (CRT) screens, liquid-crystal display (LCD) screens, plasma screens, organic light-emitting diode (OLED) screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system 800 can also include human accessible storage devices and their associated media such as optical media including CD/DVD ROM/RW 820 with CD/DVD or the like media 821, thumb-drive 822, removable hard drive or solid state drive 823, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 800 can also include interface(s) to one or more communication networks (955). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include global systems for mobile communications (GSM), third generation (3G), fourth generation (4G), fifth generation (5G), Long-Term Evolution (LTE), and the like, TV wireline or wireless wide area digital networks to include cable TV, satellite TV, and terrestrial broadcast TV, vehicular and industrial to include CANBus, and so forth. Certain networks commonly require external network interface adapters (954) that attached to certain general purpose data ports or peripheral buses (949) (such as, for example universal serial bus (USB) ports of the computer system 800; others are commonly integrated into the core of the computer system 800 by attachment to a system bus as described below (for example Ethernet interface into a PC computer system or cellular network interface into a smartphone computer system). As an example, network 855 may be connected to peripheral bus 849 using network interface 854. Using any of these networks, computer system 800 can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces (954) as described above.

Aforementioned human interface devices, human-accessible storage devices, and network interfaces can be attached to a core 840 of the computer system 800.

The core 840 can include one or more Central Processing Units (CPU) 841, Graphics Processing Units (GPU) 842, specialized programmable processing units in the form of Field Programmable Gate Areas (FPGA) 843, hardware accelerators 844 for certain tasks, and so forth. These devices, along with Read-only memory (ROM) 845. Random-access memory (RAM) 846, internal mass storage such as internal non-user accessible hard drives, solid-state drives (SSDs), and the like 847, may be connected through a system bus 848. In some computer systems, the system bus 848 can be accessible in the form of one or more physical plugs to enable extensions by additional CPUs, GPU, and the like. The peripheral devices can be attached either directly to the core's system bus 848, or through a peripheral bus 849. Architectures for a peripheral bus include peripheral component interconnect (PCI), USB, and the like.

CPUs 841, GPUs 842, FPGAs 843, and accelerators 844 can execute certain instructions that, in combination, can make up the aforementioned computer code. That computer code can be stored in ROM 845 or RAM 846. Transitional data can be also be stored in RAM 846, whereas permanent data can be stored for example, in the internal mass storage 847. Fast storage and retrieve to any of the memory devices can be enabled through the use of cache memory, that can be closely associated with one or more CPU 841, GPU 842, mass storage 847, ROM 845, RAM 846, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 800, and specifically the core 840 can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core 840 that are of non-transitory nature, such as core-internal mass storage 847 or ROM 845. The software implementing various embodiments of the present disclosure can be stored in such devices and executed by core 840. A computer-readable medium can include one or more memory devices or chips, according to particular needs. The software can cause the core 840 and specifically the processors therein (including CPU, GPU, FPGA, and the like) to execute particular processes or particular parts of particular processes described herein, including defining data structures stored in RAM 846 and modifying such data structures according to the processes defined by the software. In addition or as an alternative, the computer system can provide functionality as a result of logic hardwired or otherwise embodied in a circuit (for example: accelerator 844), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of selecting a Rice parameter for encoding a video bitstream using at least one processor, the method comprising:
   obtaining an absolute level corresponding to a current transform block;
   determining whether transform skip is enabled;
   generating a lookup variable based on the absolute level and the determination of whether the transform skip is enabled;
   obtaining the Rice parameter directly from a lookup table based on the lookup variable; and
   encoding a residual subblock based on the Rice parameter.

2. The method of claim 1, wherein the Rice parameter is obtained from the lookup table when the transform skip is enabled and when the transform skip is disabled.

3. The method of claim 1, further comprising:
   based on the transform skip being disabled, generating an adjusted variable by adjusting the absolute level based on a base level corresponding to the current transform block; and
   generating the lookup variable by clipping the adjusted variable.

4. The method of claim 1, further comprising:
   based on the transform skip being enabled, generating an adjusted variable by adjusting the absolute level; and
   generating the lookup variable by clipping the adjusted variable.

5. The method of claim 1, further comprising:
   based on the transform skip being enabled, generating an offset variable by applying an offset to the absolute level; and
   generating the lookup variable by clipping the offset variable.

6. The method of claim 1, further comprising:
   based on the transform skip being enabled, generating an adjusted variable by clipping the absolute level; and
   generating the lookup variable by applying an offset to the adjusted variable.

7. The method of claim 1, wherein the determination of whether the transform skip is enabled is performed based on a transform skip flag.

8. The method of claim 1, wherein the lookup variable is determined based on at least one from among a base level corresponding to the current transform block, a color component index, a luma location specifying a top-left sample of the current transform block relative to a top-left sample of a current picture, a current coefficient scan location, a binary logarithm of a width of the current transform block, and a binary logarithm of a height of the current transform block.

9. The method of claim 1, wherein the Rice parameter has a value between 0 and 2.

10. The method of claim 1, wherein the Rice parameter has a value between 0 and 3.

11. A device for selecting a Rice parameter for encoding a video bitstream, the device comprising:
    at least one memory configured to store program code; and
    at least one processor configured to read the program code and operate as instructed by the program code, the program code including:
    first obtaining code configured to cause the at least one processor to obtain an absolute level corresponding to a current transform block;
    determining code configured to cause the at least one processor to determine whether transform skip is enabled;
    generating code configured to cause the at least one processor to generate a lookup variable based on the absolute level and the determination of whether the transform skip is enabled;
    second obtaining code configured to cause the at least one processor to obtain the Rice parameter directly from a lookup table based on the lookup variable; and
    encoding code configured to cause the at least one processor to encode a residual subblock based on the Rice parameter.

12. The device of claim 11, wherein the Rice parameter is obtained from the lookup table when the transform skip is enabled and when the transform skip is disabled.

13. The device of claim 11, wherein the generating code comprises first generating code, and
    wherein the program code further comprises:
    second generating code configured to cause the at least one processor to, based on the transform skip being disabled, generate an adjusted variable by adjusting the absolute level based on a base level corresponding to the current transform block; and
    third generating code configured to cause the at least one processor to generate the lookup variable by clipping the adjusted variable.

14. The device of claim 11, wherein the generating code comprises first generating code, and
    wherein the program code further comprises:
    second generating code configured to cause the at least one processor to, based on the transform skip being enabled, generate an adjusted variable by adjusting the absolute level; and
    third generating code configured to cause the at least one processor to generate the lookup variable by clipping the adjusted variable.

15. The device of claim 11, wherein the generating code comprises first generating code, and
    wherein the program code further comprises:
    second generating code configured to cause the at least one processor to, based on the transform skip being enabled, generate an offset variable by applying an offset to the absolute level; and
    third generating code configured to cause the at least one processor to generate the lookup variable by clipping the offset variable.

16. The device of claim 11, further wherein the generating code comprises first generating code, and
wherein the program code further comprises:
second generating code configured to cause the at least one processor to, based on the transform skip being enabled, generate a clipped variable by clipping the absolute level; and
third generating code configured to cause the at least one processor to generate the lookup variable by applying an offset to the clipped variable.

17. The device of claim 11, wherein the determination of whether the transform skip is enabled is performed based on a transform skip flag.

18. The device of claim 11, wherein the lookup variable is determined based on at least one from among a base level corresponding to the current transform block, a color component index, a luma location specifying a top-left sample of the current transform block relative to a top-left sample of a current picture, a current coefficient scan location, a binary logarithm of a width of the current transform block, and a binary logarithm of a height of the current transform block.

19. The device of claim 11, wherein the Rice parameter has a value between 0 and 3.

20. A non-transitory computer-readable medium storing instructions, the instructions comprising: one or more instructions that, when executed by one or more processors of a device for selecting a Rice parameter for encoding a video bitstream, cause the one or more processors to:
obtain an absolute level corresponding to a current transform block;
determine whether transform skip is enabled;
generate a lookup variable based on the absolute level and the determination of whether the transform skip is enabled;
obtain the Rice parameter directly from a lookup table based on the lookup variable; and
encode a residual subblock based on the Rice parameter.

* * * * *